Oct. 23, 1945. E. J. PANISH 2,387,343
CLUTCH CONTROL
Filed Aug. 29, 1941 3 Sheets-Sheet 1
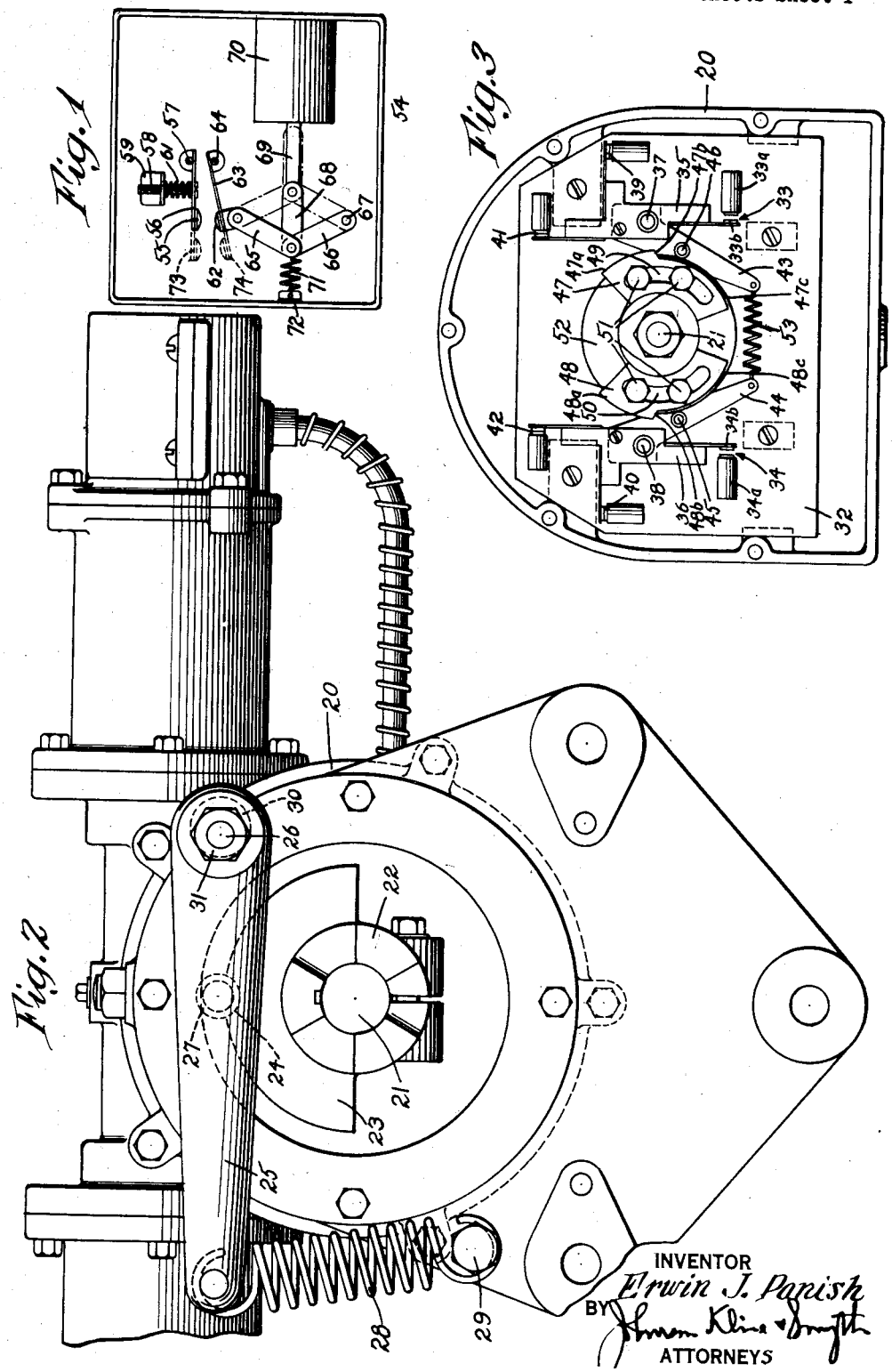
INVENTOR
Erwin J. Panish
BY
ATTORNEYS Oct. 23, 1945.　　　　E. J. PANISH　　　　2,387,343
CLUTCH CONTROL
Filed Aug. 29, 1941　　　　3 Sheets-Sheet 2

INVENTOR
Erwin J. Panish
BY
ATTORNEYS

Oct. 23, 1945.   E. J. PANISH   2,387,343
CLUTCH CONTROL
Filed Aug. 29, 1941   3 Sheets-Sheet 3

INVENTOR
Erwin J. Panish
BY
ATTORNEYS

Patented Oct. 23, 1945

2,387,343

UNITED STATES PATENT OFFICE 2,387,343

CLUTCH CONTROL

Erwin J. Panish, Bridgeport, Conn.

Application August 29, 1941, Serial No. 408,726

20 Claims. (Cl. 192—.01)

This invention relates to improvements in limit switch controlled devices, especially in electrically driven mechanisms for moving an operated member toward a desired position and automatically bringing said member to rest in said position.

The improvements of the present invention are illustrated as applied to the clutch control device for marine installations of my copending application Serial No. 399,951, filed June 26, 1941.

In said copending application, I have disclosed a direct-current motor-driven mechanism for moving a reverse gear or clutch operating shaft away from an intermediate neutral position in which the clutch is disengaged, to either one of a pair of opposite limiting positions in which the clutch is engaged for forward or reverse operation; and for returning said clutch operating shaft from either engaged position to neutral position. When said operating shaft reaches either limiting position, it encounters stop means which automatically position the driven member, the driving motor being deenergized in response to a torque-responsive overload device. However, upon return to neutral position, motor operation is controlled by limit switches which interrupt the power circuit of the motor before neutral position is reached, the inertia of the moving parts completing the operation.

In order to insure that the operating shaft will reach neutral position, considerable excess inertia must be provided, while to overcome this inertia and to arrest the mechanism when neutral position is reached, a relatively powerful yieldable detent means is required. Since the detent means must be overcome by the motor to move the clutch subsequently to engaged position, extra power must be used.

It is an object of the present invention to provide means, in limit switch-controlled devices of the aforesaid type, for automatically applying an auxiliary retarding or braking force to the moving parts of the mechanism upon interruption of the motor circuit, to assist the friction of the mechanism and/or a detent means in arresting the driven member in the desired position of rest, thereby permitting a weaker detent to be used. More specifically, it is an object to provide automatic means for rendering the motor momentarily operative as a magnetic brake upon operation of the limit switch means which deenergizes the power circuit of the motor.

This is accomplished according to the present invention by providing circuit control means operated by a magnetic relay for momentarily connecting the motor field across the line, independently of the armature winding, when the motor switch is opened by the limit switch device by movement of the driven member and its associated mechanism past a predetermined point in its travel toward the position of rest.

In one variation of the invention, the magnetic braking action of the motor is increased by simultaneously shortcircuiting the terminals of the armature winding while the field is separately energized.

In the preferred form of the invention, the motor switch itself is operated by a magnetic relay, controlled by a circuit including said limit switch which also includes the relay of the brake circuit control means.

By virtue of the improvement of the present invention, the limit switch may be adjusted to deenergize the driving motor when the driven member is relatively close to its desired position of rest, so that positioning of the member is rendered more accurate and reliable.

One feature of the invention is the provision of adjustment means for controlling the magnitude and/or duration of the braking force exerted by the motor so that the mechanism may be adjusted to position the operating member accurately.

As a result of the present improvements, yieldable detent means heretofore used to arrest the driven member in the desired position may be of much lighter construction, exerting only sufficient force, for instance to retain the driven member in the desired position against casual displacement. Since the driving force required to overcome such detent means in order to move the member away from the said position is relatively small, a less powerful motor may be used.

The device of the present invention as illustrated herein is applied in the marine clutch or reverse gear control system of my copending application, Serial No. 399,951, filed June 26, 1941. The invention is described with reference to the accompanying drawings in which:

Figure 1 is a front view of the relay-operated circuit control means of the present invention for connecting a direct-current motor as a magnetic brake.

Fig. 2 is a rear elevation of the reverse gear clutch-operating mechanism showing the coupling for engaging a clutch operating shaft.

Fig. 3 is a front view of the cam-operated limit switch device, controlling normal driving operations of the motor.

Figures 4, 5:
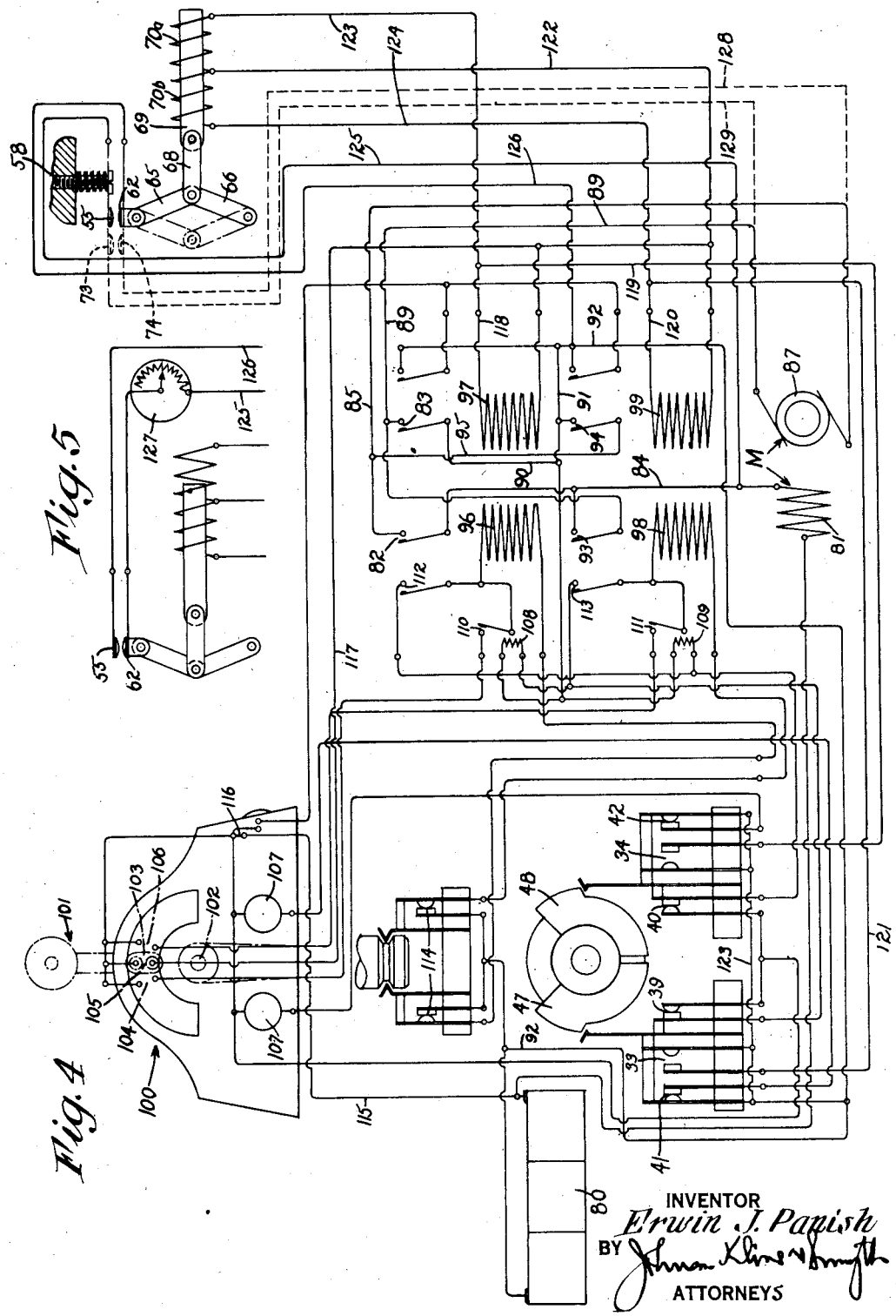
Fig. 4 is a wiring diagram of the clutch control system including the magnetic brake arrangement of the present invention.
Fig. 5 shows a modification of a portion of the wiring diagram of Fig. 4 for adjusting the magnitude of the braking force exerted by the motor.

The marine clutch control system of my aforesaid copending application comprises a reverse gear operating mechanism, shown in Fig. 2, the housing 20 of which encloses a direct current driving motor, a gear train including a worm drive coupled with the motor, and a main operating shaft 21 driven by the gear train and carrying a coupling 22 for engaging the clutch or reverse gear operating shaft of a marine installation.

The clutch operating shaft, and consequently the main operating shaft 21, are movable between arcuately spaced limiting positions in which the clutch is engaged for forward and reverse operation respectively, through an intermediate neutral position in which the clutch is disengaged. After the clutch or reverse gear has been moved to engaged position, rotation of the shaft 21 is arrested and operation of the driving motor is interrupted by an overload torque-responsive device also enclosed in the housing 20.

Motor operation is interrupted when the clutch shaft is moved to intermediate neutral position by a limit switch device controlled by cams on the shaft 20 of the operating mechanism.

In order to position the clutch shaft accurately in neutral and to prevent casual drifting away from this position, an impositive yieldable detent means is provided. The latter is illustrated in Fig. 2 as comprising a semicircular plate 23 fixed to operating shaft 20 of the actuating mechanism and having a recess 24 approximately at the midpoint of its peripheral arcuate surface. A detent lever 25, approximately tangential to said arcuate surface, is supported by a pivot 26 on the housing 20 and carries a roller 27 adapted to engage said recess. The lever 25 and roller 27 are urged toward the axis of the shaft 21 by a tension spring 28 attached to the free end of the lever, and to a bolt 29 on the housing 20. When the clutch or reverse gear is moved to neutral position, roller 27 yieldably engages recess 24 holding the shaft 21 yieldably against casual rotation.

When the motor drives the operating shaft 21 in either direction to reengage the clutch, the tension of spring 28 is overcome and the roller 27 rides up on the arcuate peripheral surface of the plate 23.

Pivot 26 includes an adjustable eccentric bearing 30 which may be secured in any adjusted position by lock nut 31, to adjust the position of roller 27 to coincide with the position of recess 24 when the clutch operating shaft is in neutral position.

The cam-operated limit switch device illustrated in Fig. 3, which is shown in neutral position, comprises an insulating plate 32 supporting a pair of switches 33 and 34 having fixed contacts 33a and 34a and movable contacts 33b and 34b respectively. Alternate closure of these switches establishes circuits for operating the motor in opposite directions to return the clutch from either engaged position to neutral position. The movable contacts 33b and 34b are carried by frames 35 and 36 respectively, supported on pivots 37 and 38, and these frames also operate limit switches 39 and 40 which are closed alternately with switches 33 and 34 to establish circuits for operating the motor to move the clutch or reverse gear to its respective engaged positions from intermediate neutral position, and limit switches 41 and 42 for controlling advancement of the engine throttle.

Frames 35 and 36 carry a pair of operating levers 43 and 44 having rollers 45 and 46 serving as cam followers. The rollers are adapted respectively to engage the peripheral surfaces of a pair of arcuate cams 47 and 48, adjustably secured by bolts 51 extending through arcuate slots 49 and 50 to a circular plate 52 carried by the end of the operating shaft 21. The said rollers are urged against the cam surfaces by a tension spring 53 joining the ends of operating levers 43 and 44.

The cams 47 and 48 comprise raised peripheral surfaces 47a and 48a terminating in shoulders 47b and 48b which are respectively adapted to engage rollers 45 or 46 upon rotation of the shaft 21 clockwise or counterclockwise from the illustrated neutral position, whereby switches 33 or 34 are closed. Upon return to neutral position, the cams release the said rollers before neutral position is reached, allowing levers 43 or 44 to move inward under the influence of spring 53 until the rollers engage the edge of the plate 52 or the inner surfaces 47c or 48c of the said cams, whereby the switches 33 and 34 are opened and the motor circuit deenergized. Since this occurs before neutral position is reached, the inertia of the moving parts of the mechanism is utilized to complete the movement of the operating shaft 21 to neutral position.

According to the present invention, automatic circuit control means is provided to cause the motor to apply a magnetic drag sufficient to overcome the inertia of the moving parts within a relatively short time after the motor circuit is opened, said drag or braking force serving to overcome the inertia of moving parts and to bring the clutch operating shaft substantially to rest in neutral position.

This means comprises an automatic switch device, adapted, when the motor circuit is opened by the limit switches 33 or 34 during operation of the reverse gear to neutral position, to alter the motor circuit for a short period of time, so that the field of the motor acts as a magnetic brake on the armature. This may be accomplished, for instance by energizing the field of the motor, either while the armature winding is deenergized, or preferably, while the armature is shortcircuited.

A form of automatic switch device suitable for the said purpose is illustrated in Fig. 1. It is enclosed in a casing 54 which may be located in any convenient position, preferably adjacent the reversing switch of the motor of the control system. The device comprises an adjustable contact 55 carried by a resilient strip 56 which is pivotally supported on the casing at 57. The head of an adjustment screw 58 engages strip 56 intermediate its ends, while the opposite end of the screw is threaded into a bracket 59 fixed to the casing 54. A compression spring 61 engaging the bracket 59 urges strip 56 against the depending head of the adjustment screw, and by turning the screw 58 in opposite directions, contact 55 may be raised or lowered.

A movable contact 62, adapted to close a circuit by engaging contact 55, is carried by a resilient strip 63 pivoted at 64 to the casing 54. The movable end of strip 63 is joined by a pair of toggle links 65 and 66 to a fixed supporting pivot 67 on the casing. The elbow joint of the said pair of links is attached by a link 68 to the armature 69 of a solenoid 70. Upon energization of the solenoid, the armature 69 moves to the right, positioning the toggle links in the manner indicated by dot and dash lines, whereby contacts 55 and 62 are separated; while when the solenoid 70 is deenergized, a tension spring 71 attached to casing 54 at 72 and to the junction of the toggle links 65 and 66 normally urges the linkage to the left, and moves them to the illustrated position, whereby contact 62 is again disengaged from contact 55. During operation of the linkage in either direction, contact 62 is raised, and then lowered engaging contact 55 for a short period of time, the extent of which may be adjusted by raising or lowering the screw 58.

If more than one circuit is to be closed to provide the desired braking effect, a second pair of contacts 73 and 74 indicated in Fig. 1 by dotted lines may be provided operated simultaneously with contacts 55 and 62 and similarly adjustable by means of the screw 58.

In the wiring diagram of Fig. 4, application of the above-described control device to the control system of my copending application Serial No. 399,951, filed June 26, 1941, is shown. Power is supplied from a battery 80, the driving motor M, being series wound to provide high starting torque. The field winding 81 is permanently connected to the positive pole of the battery 80, while switches 82 and 83, on opposite sides of the armature 87, establish when closed, a circuit from the field winding 81 through the armature to the negative pole of the battery, traversing lead 84, switch 82, lead 85, armature 87, lead 89, switch 83, leads 90, 91, and 92. Closure of switches 82 and 83 is thus adapted to operate the motor for rotation in "forward" direction, for instance, for moving the clutch away from reverse-engaged or neutral position, toward forward-engaged position.

Switches 93 and 94 are similarly adapted upon closure to establish a circuit from the field winding through the armature in the opposite direction to the negative pole of the battery, traversing lead 84, switch 93, lead 89, armature winding 87, leads 85 and 95, switch 94, and leads 91 and 92. Since the direction of the current through the armature winding is reversed, the motor will rotate in the opposite or "reverse" direction, for instance to move the clutch or reverse gear away from forward-engaged or neutral position, toward reverse-engaged position.

Motor switches 82, 83, 93 and 94 are normally urged to open-circuit position, and if desired, a mechanical interlock preventing simultaneous closure of the two pairs of switches may be provided as is usual in motor reversing switches.

For closing switches 82 and 83, electromagnets 96 and 97 are provided, each adapted upon energization to close the switches. The electromagnet 96 is used to move the clutch to forward engaged position, while electromagnet 97 is utilized to operate the clutch from reverse engaged to neutral position. Similarly, electromagnets 98 and 99 are provided, each adapted to close switches 93 and 94. Electromagnet 98 is used when the clutch is to be operated to reverse engaged position, while electromagnet 99 is energized when the clutch is moved from forward engaged position to neutral position. The improvements of the present invention cooperate principally with electromagnets 97 and 99.

A control station 100 is provided with a manual controller 101 pivotally mounted at 102 and having a bridging contactor 103 adapted in successive positions of the controller to close circuits through arcuately spaced pairs of contacts 104, 105 and 106 for initiating operation of the driving motor. The controller 101 also operates the throttle of the engine associated with the clutch, said throttle being at reduced setting when contacts 104, 105 and 106 are engaged, and advanced by movement of the controller away from said contacts in either direction.

Closure of the circuit controlled by contacts 105 initiates operation of the motor for moving the clutch from either engaged position to neutral position. The circuit through contacts 104 initiates movement of the clutch to forward engaged position, while the circuit through contacts 106 initiates clutch operations in reverse engaged position.

A pair of solenoids 107, the circuits of which are controlled respectively by limit switches 41 and 42, when energized prevent movement of the controller beyond the said contact pairs, thus preventing advancement of the throttle, until the clutch is fully engaged. Namely, when the clutch is in neutral position as illustrated, limit switches 41 and 42 are closed, solenoids 107 being energized. When the controller is moved to contacts 104 and 106, the clutch mechanism moves toward one of its engaged positions, and this causes cams 47 or 48 to open limit switch 41 or 42 deenergizing the corresponding solenoid 107 and releasing the controller for advancement of the throttle. When the clutch is again returned to neutral position, cams 47 and 48 reset limit switches 41 and 42 to reenergize solenoids 107.

When the clutch is in neutral position, limit switches 39 and 40 are closed, energizing relays 108 and 109 which hold relay switches 110 and 111 closed. This establishes a circuit from contactors 104 and 106 respectively to electromagnets 96 and 98. Upon completion of one of these circuits by appropriate movement of the controller 101, electromagnet 96 or 98 closes switches 82 and 83, or 93 and 94, causing the motor to move the clutch toward one of its engaged positions. Holding switches 112 or 113 are closed simultaneously with the said motor switches and maintain energization of the electromagnet. During operation of the mechanism toward the limiting position, cams 47 and 48 open limit switches 39 or 40, deenergizing relay 108 or 109, and opening switches 110 or 111, so that the circuit through electromagnet 96 or 98 is maintained solely by holding switch 112 or 113.

After the clutch-operating shaft 21 reaches its limiting position, torque switch 114, included in the circuit of electromagnets 96 and 98 opens in response to continued rotation of the motor, thus deenergizing the electromagnets and opening the motor switches.

With the clutch in either engaged position, movement of the controller 101 to its midposition, wherein contactor 103 bridges the intermediate pair of contacts 105, establishes a circuit from the positive pole of the battery through lead 115 (including master switch 116) to contacts 105, then through lead 117 to the electromagnets 97 and 99. The circuit from electromagnet 97 to the negative pole of the battery follows leads 118 and 119 to switch 34, while the circuit from electromagnet 99 including leads 120 and 121 terminates at limit switch 33. The switches 33 and 34 are connected by lead 123 and lead 82 to the negative pole of the battery.

When the clutch is in forward engaged position, cam 47 which has rotated counterclockwise, holds limit switch 33 closed, establishing the circuit through electromagnet 99 while switch 34 in the circuit of electromagnet 97 remains open. Upon movement of the controller to "neutral" position, wherein contacts 105 are engaged, the circuit to electromagnet 99 is completed, causing motor switches 93 and 94 to close and initiating motor operation to move the clutch toward neutral. Similarly, if the clutch is originally in reverse-engaged position, cam 48 will have closed limit switch 34, leaving limit switch 33 open, and movement of the controller to "neutral" position completes the circuit to electromagnet 97 closing motor switches 82 and 83, and initiating motor operation from reverse engaged toward neutral position.

As the clutch approaches neutral from either direction, cam 47 or 48 releases corresponding limit switch 33 or 34, thereby deenergizing the electromagnet 97 or 99, and opening the motor switches. At the same time, the cams reset limit switches 39, 40, 41 and 42 in their original closed positions.

In the auxiliary control device of the present invention, the solenoid 70 comprises two windings, 70a and 70b, connected respectively in parallel with electromagnets 97 and 99. As illustrated in Fig. 4, these two windings have a common terminal connected by lead 122 to lead 117 which is common to each of the two electromagnets 97 and 99. The opposite end of winding 70a is connected by lead 123 to lead 118, joined to the opposite terminal of electromagnet 97, while the opposite end of winding 70b is connected by lead 124 to lead 120 of electromagnet 99. Accordingly, when either of the electromagnets 97 or 99 is energized, one of the solenoid windings 70a or 70b is simultaneously energized, causing armature 69 to be moved to the right, and bringing contacts 55 and 62 temporarily into engagement; while upon deenergization of electromagnet 97 or 99, the solenoid 70 is deenergized, releasing armature 69 for movement to the left, during which contacts 55 and 62 are similarly engaged momentarily.

Contacts 55 and 62, which are joined respectively to lead 84 by lead 125, and to lead 92 by lead 126, are adapted when engaged to complete a shunt circuit from the field winding, around motor switches 82, 83, 93 and 94 and armature 87, so that the field winding of the motor is energized from the battery independently of, or in parallel with, the armature.

In operating the control system to return the clutch to neutral from either engaged position, the controller 101 is moved to its midposition wherein contactor 103 bridges contacts 105, closing the circuit to electromagnet 99 or 97, and simultaneously energizing the circuit to solenoid winding 70a or 70b. Energization of the electromagnet closes the motor switches 93 and 94, or 82 and 83, while the solenoid moves its armature 69 to the right closing the circuit through contacts 55 and 62 momentarily. As long as this circuit is closed, the field winding of the motor is fully energized, but the armature and its circuit, including the motor switches, receive only a part of the current flowing through the field. Consequently, full starting torque is not initially applied, but since the time interval of this condition is relatively short, the effect is of no great consequence. Upon completion of the movement of the solenoid armature 69, the shunt circuit through contacts 55 and 62 is opened and the motor is fully energized to move the clutch toward neutral position.

As the clutch approaches neutral position, cam 47 or 48 releases limit switch 33 or 34 and interrupts the circuit not only to electromagnet 97 or 99 but also to the solenoid 70. The motor switches 82 and 83 or 93 and 94 are opened, interrupting the circuit through the armature winding. At the same time solenoid armature 69 is released and is moved to the left by spring 71, reengaging contacts 55 and 62 momentarily. The field winding of the motor is thereby energized, while the armature circuit is open, and the field of the motor exerts a magnetic drag or braking action on the armature as long as the contacts are engaged.

The said braking action opposes the inertia of the moving parts of the mechanism, bringing the mechanism more rapidly to rest.

As the movement of solenoid armature 69 to the left is completed under the influence of spring 71, contacts 55 and 62 are again separated, opening the circuit through the motor field and releasing the braking force.

By adjusting the spacing between contacts 55 and 62 by means of screw 58, the duration of the closure of said contacts may be increased or decreased to render the duration of the braking effect longer or shorter. Thus, the device may be adjusted to bring the mechanism to rest substantially at neutral position.

Further means for adjusting the braking effect is provided in a variation of the device illustrated in Fig. 5. A variable resistance 127 is inserted in the circuit of the solenoid controlled switch contacts 55 and 62, that is in lead 125 or 126. By adjusting this resistance, the current through the field winding during the braking action may be regulated, and accordingly the magnitude of the braking force may be reduced or increased at will. An advantage of this arrangement lies in the fact that when such a resistance is inserted in the shunt circuit around the motor armature and motor switches, an increased proportion of current flows through the armature when the motor is first started, and the initial torque of the motor is correspondingly increased.

The braking force of the motor can be materially increased by short-circuiting the armature during energization of the field, after the motor switch has been opened. In another variation of the invention, this may be accomplished by providing a circuit comprising leads 128 and 129, shown in dotted lines in Fig. 4 connected respectively to leads 85 and 89 which supply the brushes of the motor, and including a switch comprising contacts 73 and 74 which are operated similarly and simultaneously with contacts 55 and 62 by solenoid 70. The resistance 127 may also be included as before in the field winding circuit, to control the magnitude of the braking force; but in this case, the effect of the said resistance to increase the starting torque of the motor during energization of the field by solenoid switches 55 and 62 will be considerably reduced. However, since this condition is of short duration, it is of no material disadvantage.

By provision of the aforesaid magnetic braking device, it is no longer necessary that the yieldable detent means, comprising roller 27 and recessed sector plate 23 should be strong enough to arrest movement of the clutch member in neutral position. Instead, the detent spring may be materially lighter, so that it possesses only sufficient force to retain the movable parts against casual drifting out of neutral position. Moreover, cams 47 and 48 may be adjusted to open the limit switches 33 or 34 to deenergize the motor when the clutch has been operated almost to neutral position, so that the clutch remains under the control of the motor for substantially its entire clutch-disengaging operation.

To permit such adjustment, without disturbing the operation of limit switches 41 and 42 which control throttle-adjusting operation of the controller 101, it is sometimes desirable to provide separate cams for controlling the latter limit switches, limit switches 39 and 40 being operated by either set of cams.

Figure 6:
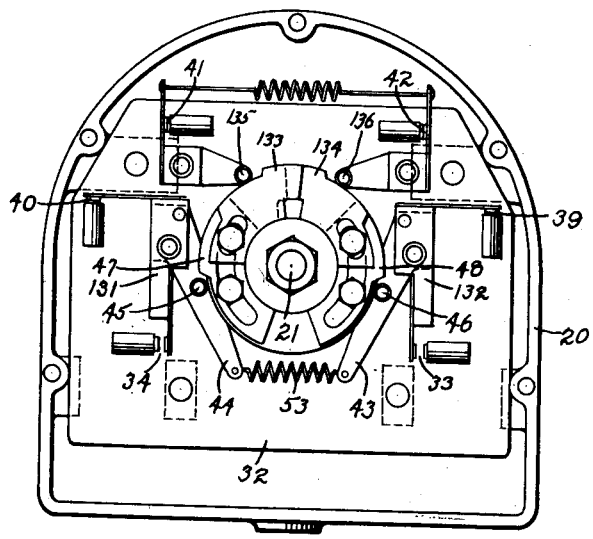
Fig. 6 shows a modification of the limit switch device of Fig. 3.

In Fig. 6, a modification of the limit switch device of Fig. 3 is shown, wherein the frames 131 and 132 which are operated by cams 47 and 48 respectively, only control limit switches 33, 34, 39 and 40. Limit switches 41 and 42 are controlled respectively by a separate pair of cams, 133 and 134, mounted on plate 52 and engaging cam followers 135 and 136 on the operating arms of said switches. By adjusting cams 133 and 134, limit switches 41 and 42 may be made to release the controller 101 for control of the throttle after the clutch is engaged, while cams 47 and 48 may be adjusted to open limit switches 33 and 34 as close to neutral position as desired.

While the device of the present invention has been described as applied to the marine clutch control system of my copending application, it may be similarly used to control the stopping of any motor driven member, where a limit switch is utilized to automatically interrupt operation of the driving motor when the member approaches the position in which it is desired to arrest its motion.

Variations and modifications may be made within the scope of this invention and portions of the improvements may be used without others.

I claim:

1. In combination with a direct current motor having an armature and field winding, and an energizing circuit therefor including current supply means, power control means for interrupting said circuit; control means for energizing the field winding from said current supply means independently of the armature whereby a magnetic brake is applied by the field to the armature and automatic means rendering said control means operative upon operation of said power control means to interrupt the motor circuit.

2. In combination with a direct current motor having an armature and field winding, and an energizing circuit therefor including current supply means, power control means for interrupting said circuit; control means for energizing the field winding from said current supply means independently of the armature; automatic means rendering said control means operative upon operation of said power control means to interrupt the motor circuit, whereby the field winding exerts a magnetic drag on the armature; and means for varying the magnitude of the braking effect produced thereby.

3. In combination with a direct current motor having an armature and field winding, and an energizing circuit therefor including current supply means, power control means for interrupting said circuit; control means for energizing the field winding from said current supply means independently of the armature, and simultaneously short-circuiting the armature terminals; and automatic means rendering said control means operative upon operation of said power control means to interrupt the motor circuit.

4. In combination with a direct current motor having an armature and field winding, and an energizing circuit therefor including current supply means, power control means for interrupting said circuit; control means for energizing the field winding from said current supply means independently of the armature; and automatic means for rendering said control means temporarily operative for a predetermined time interval upon operation of said power control means to interrupt the motor circuit.

5. In combination with a direct current motor having an armature and field winding, and an energizing circuit therefor including current supply means, power control means for interrupting said circuit; control means for energizing the field winding from said current supply means independently of the armature; automatic means for rendering said control means operative upon operation of said power control means to interrupt the motor circuit; and means for adjusting the magnitude of the field current for independent energization thereof.

6. In combination with a direct current motor having field and armature windings and a power circuit for energization thereof including current supply means, means for opening and closing the power circuit; a circuit for energizing the field winding from said current supply means independently of the armature; automatic means for energizing the latter circuit upon opening of the power circuit; and means for varying the resistance of said independent field circuit for controlling the magnitude of the field current during independent energization thereof.

7. In combination with a direct current motor having field and armature windings and a power circuit for energization thereof including current supply means, means for opening and closing the power circuit; a secondary circuit for energizing the field winding from said current supply means independently of the armature; a switch in the secondary circuit comprising a pair of contacts; automatic means for moving said contacts toward and away from each other for momentary engagement thereof to close said secondary circuit upon opening of the power circuit, whereby said secondary field circuit is temporarily energized; and means for adjusting the spacing of said contacts to control the duration of their engagement.

8. In combination with a direct current motor having field and armature windings and a power circuit for energization thereof including current supply means, switch means for opening and closing the power circuit; electromagnetic relay means for operating said switch means; a secondary circuit for energizing the field winding from said current supply means independently of the armature; switch means for opening and closing the secondary circuit; electromagnetic relay means for operating the latter switch means; a control circuit common to both of said electromagnetic relay means; and means for operating said control circuit to open said power circuit switch, said operation at the same time closing said secondary field circuit switch to energize the field of the motor independently of the armature.

9. In combination with a series-wound direct current motor having an armature and field winding, a power circuit therefor including switch means connected to a terminal of the armature; an electromagnetic relay for opening and closing said switch means; a shunt circuit around said armature and said switch means for energizing the field independently of the armature; switch means in said shunt circuit; a solenoid adapted, upon energization, and similarly upon deenergization, to first close and then reopen the latter switch means; a control circuit common to said electromagnetic relay means and to said solenoid; and means for controlling energization of said control circuit, said means effecting temporary closure of said field circuit by said solenoid-controlled switch means upon opening as well as upon closing of said power circuit by said relay-controlled switch means.

10. In combination with a series-wound direct current motor having an armature and field winding, a power circuit therefor including switch means connected to a terminal of the armature; an electromagnetic relay for opening and closing said switch means; a shunt circuit around said armature and said switch means for energizing the field independently of the armature; a switch controlling said shunt circuit; a solenoid adapted, upon energization, and similarly upon deenergization, to first close and then reopen the latter switch means; a control circuit common to said electromagnetic relay means and to said solenoid; means for controlling energization of said control circuit, said means effecting temporary closure of said field circuit by said solenoid-controlled switch means upon opening as well as upon closing of said power circuit by said relay-controlled switch means; and means for varying the resistance of said shunt circuit, whereby the field current and armature current may be varied during closure of the solenoid-controlled switch means.

11. A device for moving a driven member to and from opposite operating positions relative to an intermediate idling position, having an electric driving motor with an armature and field winding, and a power circuit for energizing the motor to move said member toward said idling position; means for mechanically yieldingly arresting and holding said driven member in idling position; limit switch means for interrupting said power circuit when the driven member reaches a control position, adjacent said idling position, wherein the moving parts of the device have sufficient excess inertia to overcome said arresting and holding means and overrun the idling position; and automatic circuit control means rendered operative upon deenergization of said power circuit for momentarily energizing the field winding of the motor independently of the armature, whereby a magnetic drag on the armature is produced for overcoming said excess inertia and the driven member is arrested in idling position.

12. A device for moving a driven member to and from opposite operating positions relative to an intermediate idling position, having an electric driving motor with an armature and field winding; a power circuit for energizing the motor to move said member toward said idling position; means for mechanically yieldingly arresting and holding said driven member in idling position; limit switch means for interrupting said power circuit when the driven member reaches a control position adjacent said stop position wherein the moving parts of the device have sufficient excess inertia to overrun the idling position; and automatic circuit control means rendered operative upon deenergization of said power circuit for momentarily producing a magnetic drag on the armature for overcoming said excess inertia and permit the driven member to be arrested in idling position by said yielding means.

13. A device for moving a driven member to and from opposite operating positions relative to an intermediate idling position, having an electric driving motor with an armature and field winding; a power circuit for energizing the motor to move said member toward said idling position; means for mechanically yieldingly arresting and holding said driven member in idling position; limit switch means for interrupting said power circuit when the driven member reaches a control position adjacent said idling position, wherein the moving parts of the device have sufficient excess inertia to overcome said arresting and holding means and overrun the idling position; automatic circuit control means rendered operative upon deenergization of said power circuit to momentarily energize the field winding of the motor independently of the armature, and thereby to produce a magnetic drag on the armature for overcoming said excess inertia; and means for controlling the magnitude of said magnetic drag to that necessary to cause the driven member to be arrested in idling position.

14. A device for moving a driven member to and from opposite operating positions relative to an intermediate idling position, having an electric driving motor with an armature and field winding; a power circuit for energizing the motor to move said member toward said idling position; means for mechanically yieldingly arresting and holding said driven member in idling position; limit switch means for interrupting said power circuit when the driven member reaches a control position, adjacent said idling position, wherein the moving parts of the device have sufficient excess inertia to overcome said arresting and holding means and overrun the idling position; and automatic circuit control means rendered operative upon deenergization of said power circuit for momentarily energizing the field winding of the motor independently of the armature and for simultaneously shortcircuiting the armature winding, whereby a magnetic drag on the armature is produced for overcoming said excess inertia and the driven member is arrested in idling position.

15. A device for moving a driven member to and from opposite operating positions relative to an intermediate idling position, having an electric driving motor with an armature and field winding; a power circuit for energizing the motor to move said member toward said idling position; means for mechanically yieldingly arresting and holding said driven member in idling position; limit switch means for interrupting said power circuit when the driven member reaches a control position, adjacent said idling position, wherein the moving parts of the device have sufficient excess inertia to overrun the idling position; automatic circuit control means rendered operative upon deenergization of said power circuit for energizing the field winding of the motor independently of the armature to produce a magnetic drag on the armature for overcoming said excess inertia and permit the driven member to be arrested in idling position by said yielding means; and means for varying the resistance of the field circuit during independent energization thereof for adjusting the magnitude of said magnetic drag on the armature.

16. A device for moving a driven member to and from opposite operating positions relative to an intermediate idling position, having an electric driving motor with an armature and field winding; a power circuit for energizing said motor to move said member toward said idling position; switch means for controlling energization of said power circuit; electromagnetic relay means for operating said switch means; an auxiliary circuit for energizing the field of said motor independently of the armature; switch means controlling the latter circuit; electromagnetic relay means for operating the latter switch means; a control circuit common to both of said electromagnetic relay means; means for mechanically yieldingly arresting and holding said driven member in idling position; and limit switch means in said control circuit, automatically operated when the driven member reaches a control position adjacent said idling position, wherein the moving parts of the device have sufficient excess inertia to overrun the idling position, said limit switch operation conditioning said relay-controlled power-circuit switch means to deenergize the power circuit and at the same time conditioning said relay-controlled auxiliary-circuit switch means to close the independent circuit to the field momentarily, whereby a magnetic drag on the armature is produced for overcoming said excess inertia and the driven member is arrested in idling position.

17. A device for moving a driven member to and from opposite operating positions relative to an intermediate idling or neutral position, comprising a direct-current series-wound motor therefor having armature and field windings; a power circuit for energizing the motor including switch means connected to a terminal of the armature; a shunt circuit around said armature and said switch means for energizing the field independently of the armature; control means for said power circuit, and for said shunt circuit; means for mechanically yieldingly arresting and holding said driven member in idling position; and limit switch means operative upon said driven member reaching a control position adjacent said neutral position wherein the moving parts of the device have sufficient excess inertia to overcome said arresting and holding means and overrun said neutral position, said limit switch means operating said control means to open said power circuit switch and to cause momentary energization of said shunt circuit, whereby said field winding is energized independently of the armature, and a magnetic drag on the armature is produced for overcoming said excess inertia and causing the driven member to be arrested in idling position.

18. A device for moving a driven member to a predetermined stop position, comprising a direct-current series-wound driving motor, having an armature and field winding; a power circuit for energizing the motor to move said member toward said stop position, said circuit including switch means connected to a terminal of the armature; an electromagnetic relay for opening and closing said switch means; a shunt circuit around said armature and said switch means for energizing the field independently of the armature; a switch controlling said shunt circuit; a solenoid adapted upon energization, and similarly upon deenergization, to first close and then reopen the latter switch means; a control circuit common to said electromagnetic relay means and to said solenoid; limit switch means in said control circuit operated upon said driven member reaching a control position adjacent said stop position, wherein the moving parts of the device have sufficient excess inertia to overrun the stop position, operation of said limit switch means effecting deenergization of said power circuit by said relay-controlled switch means, and temporary energization of said shunt circuit by operation of said solenoid-controlled switch means, whereby the field winding of the motor is temporarily energized, and a magnetic drag on the armature is produced for overcoming said excess inertia; and means for varying the resistance of said shunt circuit, whereby the field current and armature current may be varied during temporary closure of the solenoid-controlled switch means for regulating the magnitude of said magnetic drag.

19. In combination with a reverse gear and clutch device having forward and rearward operating positions and a neutral or idle position between said operating positions, operating means for said device including an electric motor and circuits therefor opened, closed and reversed for stopping, operating and reversing said motor; limit switch means for automatically opening said circuit to the motor when the operating means approaches neutral position from either the forward or rearward operating position of the device; and means for causing a momentary electromagnetic braking force to be applied to the device after the motor operating circuit is opened and as said operating neutral position is reached for dissipating the momentum of the parts of the device and operating means and prevent overrunning beyond the neutral position.

20. In combination with a reverse gear and clutch device having forward and rearward operating positions and a neutral or idle position between said operating positions, operating means for said device including an electric motor and circuits therefor opened, closed and reversed for stopping, operating and reversing said motor; limit switch means for automatically opening said circuit to the motor when the operating means approaches neutral position from either the forward or rearward operating position of the device; mechanical means for locating the device in neutral position and maintaining the same so positioned against casual displacement; and means for causing a momentary electromagnetic braking force to be applied on the device after the motor operating circuit is opened and before said mechanical means acts for dissipating the momentum of the parts of the device and operating means and prevent overrunning beyond the position controlled by said mechanical means.

ERWIN J. PANISH.